United States Patent [19]
Prevey, III

[11] Patent Number: 5,826,453
[45] Date of Patent: Oct. 27, 1998

[54] BURNISHING METHOD AND APPARATUS FOR PROVIDING A LAYER OF COMPRESSIVE RESIDUAL STRESS IN THE SURFACE OF A WORKPIECE

[75] Inventor: Paul S. Prevey, III, Cincinnati, Ohio

[73] Assignee: Lambda Research, Inc., Cincinnati, Ohio

[21] Appl. No.: 761,064

[22] Filed: Dec. 5, 1996

[51] Int. Cl.[6] .................................................. B21D 31/00
[52] U.S. Cl. ................................ 72/75; 29/90.01; 72/377
[58] Field of Search ............................... 72/75, 110, 377; 29/90.01

[56] References Cited

U.S. PATENT DOCUMENTS

| | | |
|---|---|---|
| 3,494,013 | 2/1970 | Gottschald . |
| 3,770,595 | 11/1973 | Cros et al. ................................. 72/377 |
| 3,820,210 | 6/1974 | Kalen . |
| 4,118,846 | 10/1978 | Korte . |
| 4,132,098 | 1/1979 | Culver et al. . |
| 4,246,684 | 1/1981 | Barker . |
| 4,565,081 | 1/1986 | Massee . |
| 4,821,388 | 4/1989 | Okumura et al. . |
| 4,947,668 | 8/1990 | Ostertag ..................................... 72/75 |
| 5,099,558 | 3/1992 | Wilson . |
| 5,329,684 | 7/1994 | Budet et al. . |
| 5,666,841 | 9/1997 | Seger et al. ............................... 72/110 |

OTHER PUBLICATIONS

*Classification of Metal–Burnishing Methods and Tools*, Y.U.G. Shneider, Machines and Tooling, vol. XL, No. 1, pp. 35–39 (1969).

*Statistical Analysis of the Effects of Ball Burnishing Parameters on Surface Hardness*, by N.H. Loh, S.C. Tam, and B. Miyazawa, Elsevier Sequola (1988).

*Wear*, by M. Fattouh, M.H. Blaxir and S.M. Serage, Elsevier Sequola, vol. 127, pp. 123–127 (1988).

*Primary Examiner*—Lowell A. Larson
*Attorney, Agent, or Firm*—Mark F. Smith; Smith, Brandenburg, Freese & Knochelman

[57] ABSTRACT

The burnishing method and apparatus for implementing the method of the present invention utilizes a single-point burnishing process to provide deep compression with a minimal amount of cold working and surface hardening. In particular, the area to be burnished along the surface of a workpiece is defined and a freely rotating burnishing ball is forced against the surface of the workpiece to produce a zone of deformation having a deep layer of compression within the surface. The burnishing ball is then rolled over the surface in a substantially nonoverlapping pattern. A preferred embodiment of the burnishing apparatus for implementing the burnishing method comprises a socket having a tip member incorporating a ball seat, a burnishing ball disposed within the ball seat, a rod member integrally formed with the tip member; and a socket support for supporting the socket on a conventional tool holder. The socket is provided with means for directing lubrication fluid from a reservoir to the ball seat to permit the burnishing ball to freely rotate and for directing a predetermined amount of lubrication fluid to the surface of the workpiece.

20 Claims, 10 Drawing Sheets

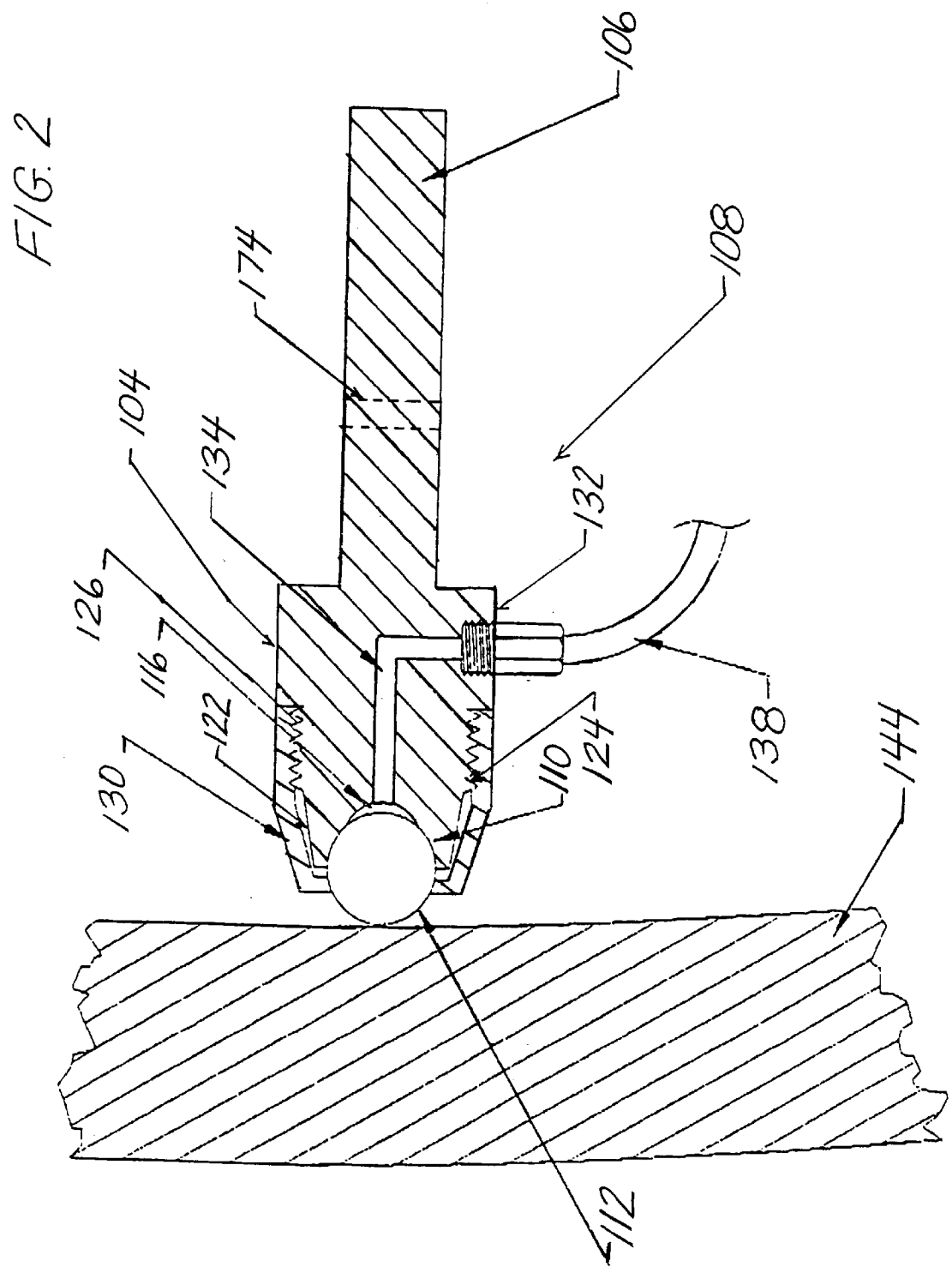

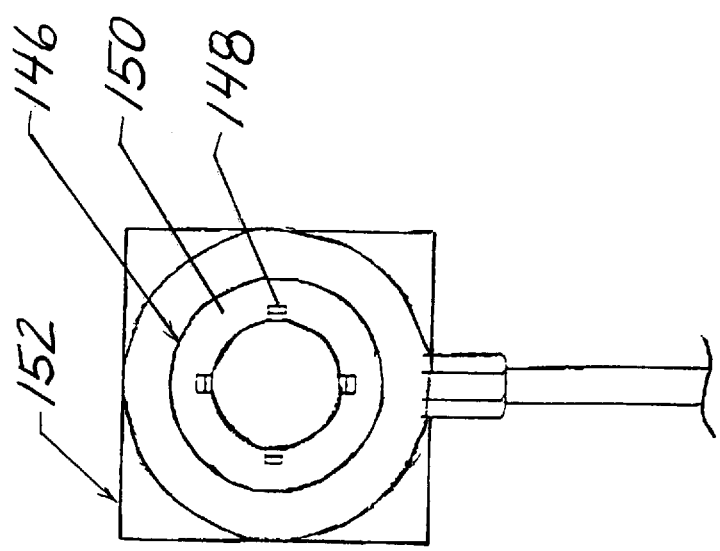

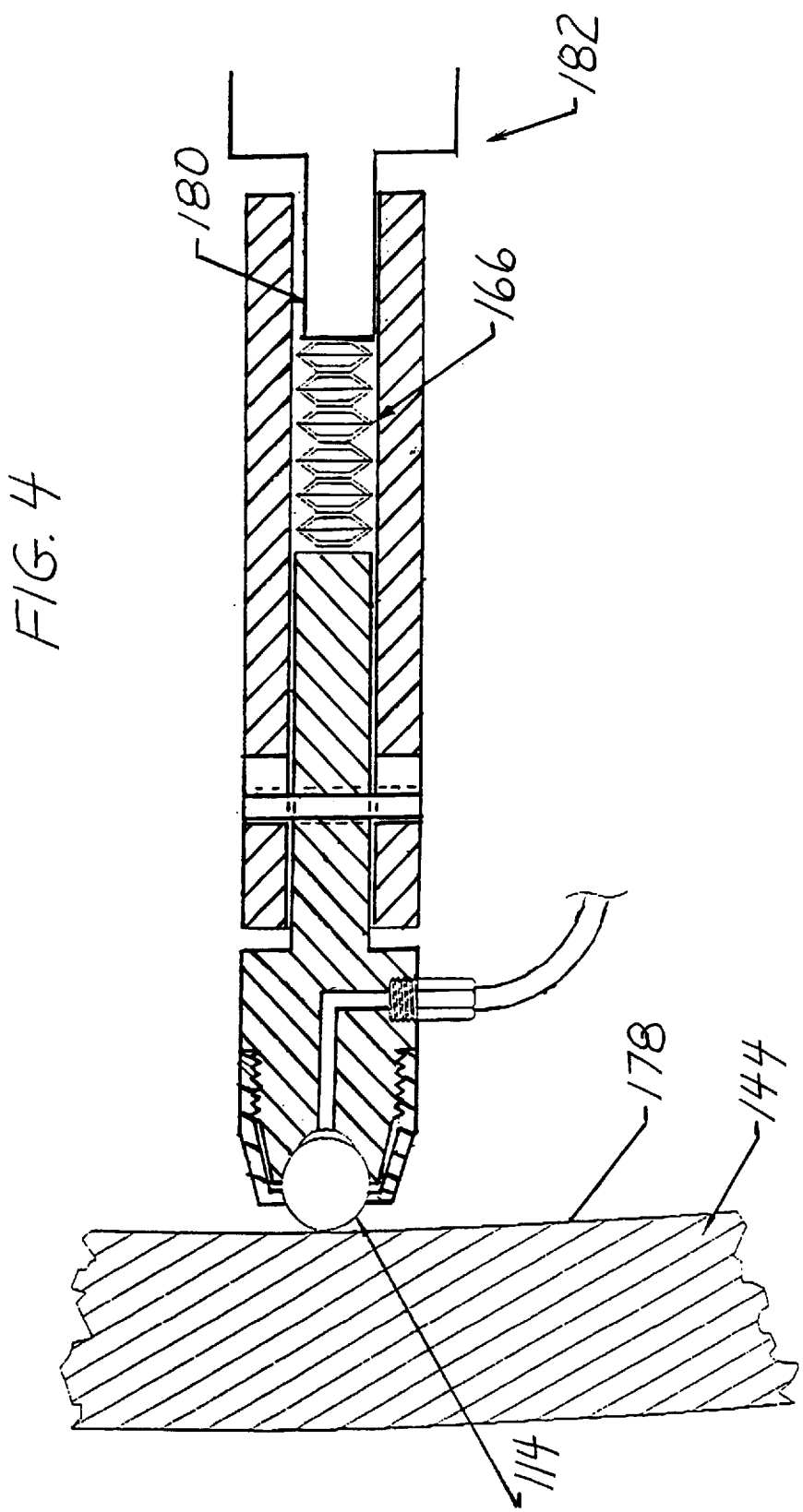

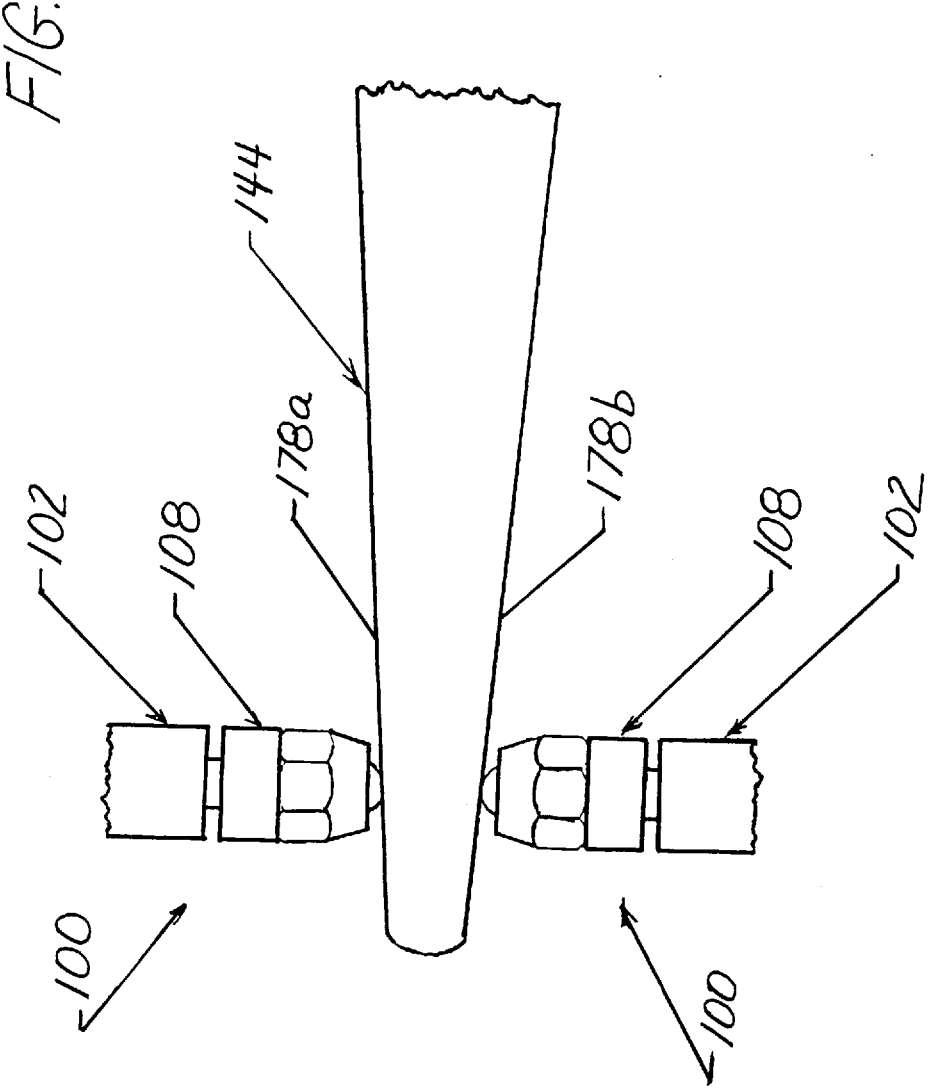

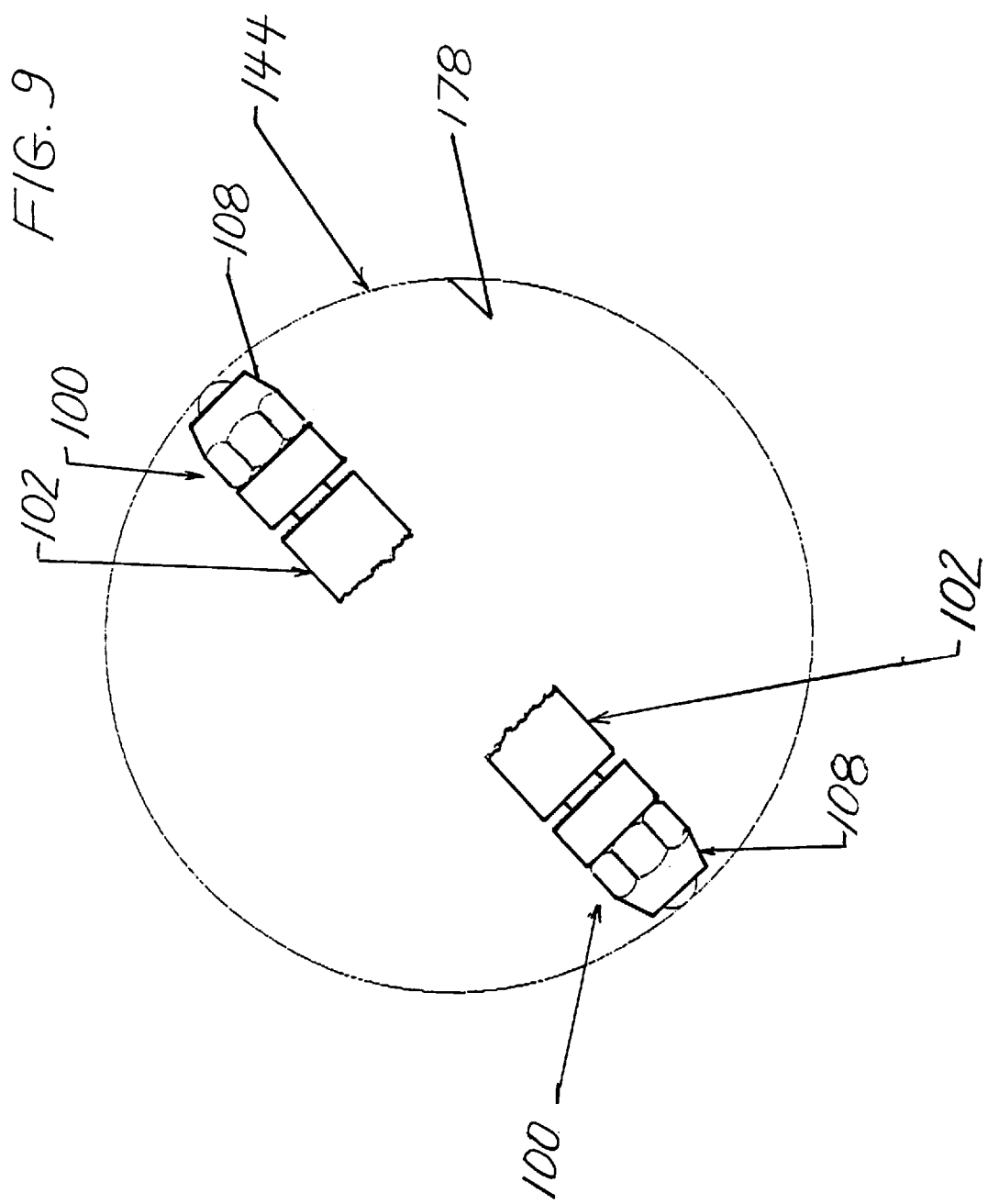

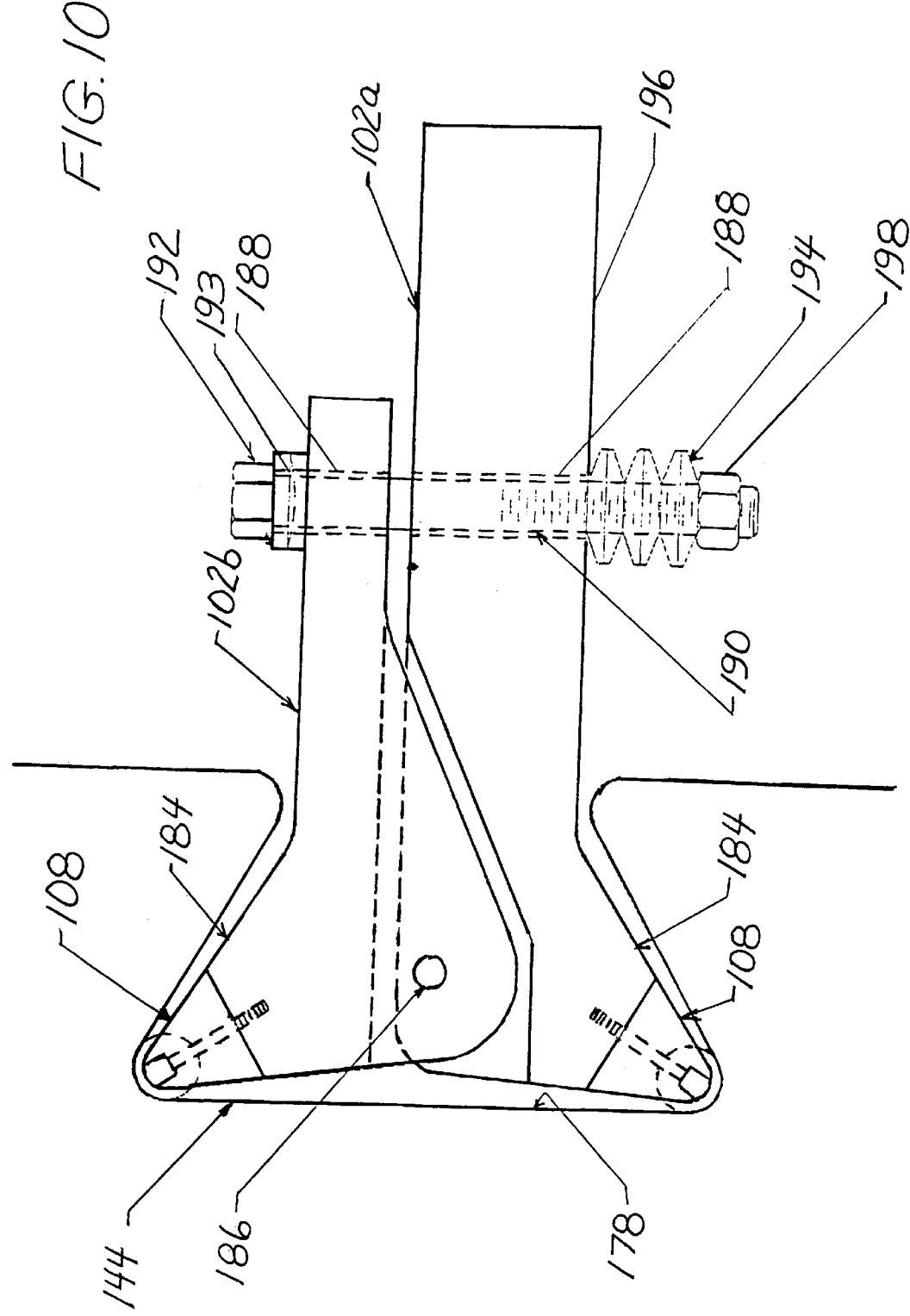

BURNISHING METHOD AND APPARATUS FOR PROVIDING A LAYER OF COMPRESSIVE RESIDUAL STRESS IN THE SURFACE OF A WORKPIECE

BACKGROUND OF INVENTION

This invention relates to a burnishing operation and, more particularly, to an apparatus and a method of burnishing to induce a layer of compressive residual stress in the surface of a workpiece to provide a part with a relatively good finish and improved physical properties.

Surface residual stresses are known to have a major affect upon the fatigue and stress corrosion performance of components in service. Tensile residual stresses, which can be developed during manufacturing processes such as grinding, turning, or welding are well known to reduce both fatigue life and increase sensitivity to corrosion-fatigue and stress corrosion cracking in a wide variety of materials. It is well known that compressive residual stresses induced in the surface of a workpiece can increase fatigue life and reduce susceptibility to corrosion-fatigue and stress corrosion cracking. However, the benefit of a layer of surface compression in reducing susceptibility to stress corrosion, cracking, fatigue, and corrosion-fatigue is lost if the layer of compression relaxes with time in service.

There are many methods currently used for inducing compressive stress in the surface of a metal part and the particular method selected depends on several factors including the dimensions and shape of the workpiece, its strength and stiffness, the desired quality of the finished surface, the desired physical properties of the finished part, and the expense of performing the operation.

Burnishing has been used to improve surface finish, fatigue life, and corrosion resistance. The accepted practice for burnishing utilizes repeated deformation of the surface of the component, in order to deliberately cold work the surface of the material, to increase the yield strength. Compressive stresses are developed by yielding the surface of the material in tension so that it returns in a state of compression following deformation. Unfortunately however, excess cold working may produce tensile surface residual stresses and may leave the surface susceptible to overload and thermal relaxation.

One method commonly used in the industry to induce compressive stress in the surface of a workpiece is shot peening, whereby a plurality of metallic or ceramic pellets are projected mechanically or through air pressure to impinge the surface of a workpiece. While such a method is relatively inexpensive and is preferred for many applications, in order to obtain total coverage of the workpiece, areas of impingement often overlap. Such overlapping of areas of impingement often results in a large amount of cold working which leaves the surface compressive layer susceptible to stress relaxation. Further, shot peening is unacceptable for use for parts requiring a superior finish, localized compressive stress zones, or requiring a greater depth of compressive stress penetration.

Another method, similar to shot peening, commonly used in the industry to induce compressive stress in the surface of a workpiece is gravity peening, whereby pellets are dropped through a chute from a predetermined distance onto the surface of the workpiece. While gravity peening uses a smaller number of larger pellets to deform the surface, the workpiece continues to be subjected to a substantial amount of cold working. Further, like shot peening methods, gravity peening is often unacceptable for use with parts requiring a superior finish, localized compressive stress zones, or requiring a greater depth of compressive stress penetration.

Another method commonly used in industry for inducing compressive stress on the surface of a workpiece is by burnishing, whereby the contact portion of a burnishing assembly is pressed against the surface of the workpiece to deliberately cold work the surface to minimize surface roughness and increase surface hardness, thereby improving the fatigue strength of the part. Until now, it has been believed that the surface of a workpiece must be extensively cold worked by making multiple passes over the surface with the contact portion of the burnishing assembly with sufficient pressure to crush the elevations in the surface topography to achieve the desired surface hardness and therefore the desired residual compressive stress.

The burnishing apparatus utilized for cold working the surface of a workpiece typically comprise a plurality of cylindrical rollers or balls which contact the surface of the workpiece with sufficient pressure to cold work the surface to induce a compressive stress therein. Such burnishing apparatus, however, are typically limited to cylindrical or flat workpieces. Further, the use of multiple passes often results in excessive cold working which may cause surface tensile residual stresses, and leaving the compressive layer subject to relaxation.

It is also known that by lubricating the surface of the workpiece, the amount of surface damage resulting from the burnishing process can be significantly reduced. Unfortunately however, until now the application of lubricant has been performed by hand or with the use of a separate applicator which often hinders or prevents adequate lubrication at the point of contact of the workpiece and the contact portion of the burnishing apparatus.

Consequently, a need exists for a relatively inexpensive method and apparatus for implementing the method for improving the physical properties of a part by inducing a layer of compressive stress in the surface of the part, which is effective for use with complex curved surfaces and which provides for longer retention of compressive stresses than have previously been available using conventional methods of burnishing or shot peening.

SUMMERY OF THE INVENTION

The novel method and apparatus for implementing the method of the present invention utilizes the process of single-point burnishing to induce a layer of compressive residual stress with a minimal amount of cold working and surface hardening for providing for much longer retention of the compressive stresses than have previously been available using conventional methods of burnishing or shot peening. In particular, the area to be burnished along the surface of the workpiece is defined and a burnishing apparatus having a single-point of contact burnishing means is forced against the surface of the workpiece to produce a zone of deformation having a deep layer of compression within the surface. The burnishing apparatus is then passed in a predetermined pattern across the area to be burnished such that the zones of deformation formed by each pass of the burnishing apparatus do not overlap.

In another preferred embodiment of the present invention, compressive stress is induced in the surface of a part by a method utilizing the burnishing apparatus of the present invention. More particularly, the method further comprises the steps of predetermining and adjusting the application force to be applied against the surface of the workpiece; predetermining the amount of lubrication and cooling required for the burnishing operation; automatically supplying the required lubrication fluid; adjusting fluid pressure to provide the proper amount of lubrication fluid to the surface of the workpiece; and programming a control unit to direct the burnishing apparatus to make a plurality of passes over the workpiece to provide the maximum compressive residual stress with the minimum of cold working and surface hardening.

In another preferred embodiment of the invention the burnishing apparatus for implementing the burnishing method of the subject invention comprises a tip member incorporating a ball seat, a burnishing ball disposed within the ball seat, a rod member integrally formed with the tip member to define a socket, and a socket support for supporting the socket on a conventional tool holder. The socket is provided with means for directing lubrication fluid from a reservoir to the ball seat to permit the burnishing ball to freely rotate and for directing a predetermined amount of lubricating fluid to the surface of the workpiece.

In operation, lubrication fluid is directed into the tip member of the socket to force the burnishing ball outwardly towards the surface of the workpiece to be burnished. Capillary action draws lubrication fluid around the outer surface of the burnishing ball until fluid pressure is equalized to permit the burnishing ball to float continuously upon a thin film of lubrication fluid to allow the burnishing ball to function as a freely rotating fluid bearing and to permit a sufficient amount of lubrication fluid to transfer onto the surface of the workpiece to provide lubrication and cooling.

In another preferred embodiment of the invention, the burnishing apparatus for implementing the burnishing method of the subject invention is provided with means for adjusting the compression force being applied to the surface of the workpiece.

In another preferred embodiment of the invention, the burnishing apparatus for implementing the burnishing method of the subject invention is connected to a control device for automatically controlling the movement, position and compression force of the burnishing ball.

A primary object of this invention, therefore, is to provide a method and an apparatus for implementing the method of providing a part with an improved finish and with improved physical properties.

Another primary object of this invention is to provide a method and an apparatus for implementing the method of inducing a compressive stress layer on the surface of a part.

Another primary object of this invention is to provide a method and an apparatus for implementing the method of inducing a compressive stress layer on the surface of a part which is relatively inexpensive.

Another primary object of this invention is to provide a method and an apparatus for implementing the method of inducing a compressive stress layer having a relatively well defined localized compressive stress zone.

Another primary object of this invention is to provide a method and an apparatus for implementing the method of inducing a compressive stress layer on the surface of a part and which provides a much longer retention of the compressive stresses than have previously been available using conventional methods of burnishing or shot peening.

Another primary object of this invention is a method and an apparatus for implementing the method of inducing a compressive stress layer on the surface of a part with the minimum of cold working and work hardening of the surface.

Another primary object of this invention is to provide an apparatus for inducing a compressive stress layer on the surface of a part and which automatically provides the work surface of a metal part with a fluid for lubricating and cooling the work surface during burnishing operations.

Another primary object of this invention is to provide an apparatus for inducing a compressive stress layer on the surface of a part and which can be adjusted to provide a predetermined compressive force on the surface of the workpiece.

Other objects and advantages of the invention will be apparent from the following description, the accompanying drawings and the appended claims.

BRIEF DESCRIPTION OF THE DRAWINGS

FIG. 2 is a longitudinal cross-sectional view of the socket of FIG. 1 showing the generally cylindrical tip member integrally formed with a generally cylindrical rod member;

FIG. 3 is an end view of the ball burnishing head of FIG. 1 showing the burnishing ball and the retaining edge of the retaining cap having a plurality of channels protruding therethrough;

FIG. 4 is a longitudinal cross-sectional view of another preferred embodiment of the burnishing apparatus showing the use of a follower rod for adjusting the compressive force of the burnishing ball against the surface of a workpiece;

FIG. 8 is a partial side view of more than one burnishing apparatus of FIG. 1 showing a method of simultaneously burnishing more than one side of a workpiece;

FIG. 9 is a partial side view of more than one burnishing apparatus of FIG. 1 showing a method of burnishing the interior surface of a workpiece; and FIG. 10 is a partial side view of another embodiment of the burnishing apparatus of FIG. 1 showing a method of burnishing the surface of a workpiece having a acute surface angle such as a dovetail slot of a turbine or compressor disk.

DETAILED DESCRIPTION OF PREFERRED EMBODIMENT

The burnishing method of the present invention utilizes the process of single-point burnishing to provide deep compression with a minimal amount of cold working and surface hardening. In particular, the area to be burnished along the surface of the workpiece is defined and a burnishing apparatus having a single-point of contact burnishing means is forced against the surface of the workpiece to produce a zone of deformation producing a deep layer of compression within the surface. The burnishing means is then passed in a predetermined pattern across the area to be burnished such that the zones of deformation formed by each pass of the burnishing means do not overlap. It has been unexpectedly found that the single-point burnishing method, applied in a single-pass, or multiple passes of reduced compressive force, is effective for producing compressive residual stresses following tensile deformation of the surface to produce deep compression with minimal cold working.

Figure 1:
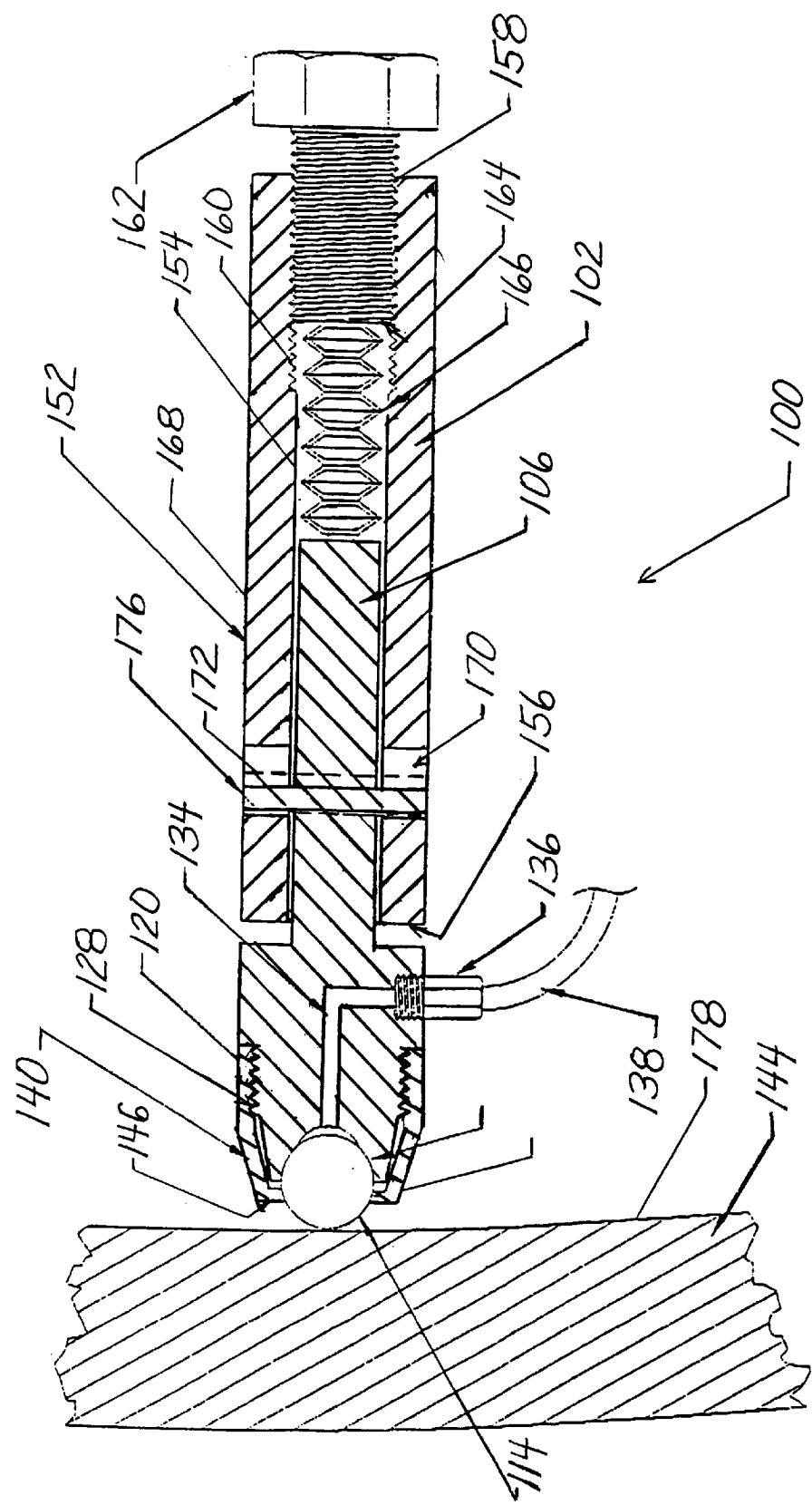
FIG. 1 is a longitudinal cross-sectional view of a preferred embodiment of the burnishing apparatus of the present invention.

Referring to FIGS. 1 and 2, a preferred embodiment of the burnishing apparatus 100 for implementing the burnishing method of the subject invention is shown comprising a generally cylindrical tip member 104 integrally formed with a generally cylindrical rod member 106 to define a socket 108, and a socket support 102 for supporting the socket on a conventional tool holder (not shown).

The tip member 104 includes a ball seat 110 having an essentially spherical shape adapted to the surface 112 of a burnishing ball 114 which is disposed within the ball seat 110. The size of the ball seat 110 is determined by the diameter of the burnishing ball 114 and is selected to provide a small clearance 116 between the support surface 118 of the ball seat 110 and the burnishing ball 114. The burnishing ball 114 may be selected from various materials having a higher yield strength than the workpiece and having a relatively high elastic modules to allow maximal deformation of the workpiece. Typical materials include, but are not limited to, hardened steel, tungsten carbide and other similar materials. The outer peripheral surface 120 of the tip member 104 includes a tapered outer portion 122 and a cylindrical intermediate portion 124 having a threaded outer surface 126 for mating with the inner threaded surface 128 of a retaining cap 130, and an inner portion 132 of somewhat greater diameter than the intermediate portion 124. The tip member 104 of the socket 108 is further provided with a fluid passage 134 in flow communication with the ball seat 110 and extending from the ball seat 110 through the tip member 104 to a fitting 136 for connecting to an external fluid supply 138.

The retaining cap 130 is adapted to the size and configuration of the tip member 104 to be positioned longitudinally along and encircling the outer peripheral surface 120 of the tip member 104. The forward portion 140 of the outer peripheral surface 142 of the retainer cap 130 is tapered to provide minimum interference with the arbitrary geometry of a workpiece 144, and includes a radially inwardly extending retaining edge 146 for loosely retaining the burnishing ball 114 in the ball seat 110. Referring to FIG. 3, several channels 148 are spaced along the surface 150 of the retaining edge 146 and penetrate axially therethrough, the purpose of which will be presently described.

The socket support 102 of the burnishing apparatus 100 includes a slide 152 comprising a longitudinally extending bore 154 having a first end 156 for receiving the rod member 106 of the burnishing socket 108 and a second end 158 having a threaded inner surface 160. Received on the threads is a pressure adjustment screw 162 having an inner end 164 which is coupled to the rod member 106 of the burnishing socket 108 through a mechanical spring means 166 such as a Belvil or compression spring or other like means. In order to lock the rod member 106 within the first end 156 of the slide 152, the outer peripheral surface 168 of the socket support 102 is provided with first and second recesses 170 each having a radially extending aperture 172 which cooperate with a radially extending aperture 174 (FIG. 2) in the rod member 106 for receiving a lock pin 176. The recesses and lock pin 176 configuration allows the socket 108 to expand or contract axially towards or away from the workpiece 144 while permitting the socket 108 to be easily attached or detached from the socket support 102. However, other locking means such as detentes, locking screws, and the like may also be utilized for retaining the rod member 106 within the bore 154 of the slide 152.

Referring to FIG. 3, the slide 152 has a generally rectangular cross-section to permit it to be easily mounted to a fixture of any particular description for controlling the movement of the burnishing apparatus 100, for example within the recess of a conventional lathe tool post. However, other cross-sectional configurations, such as a circular cross-section, may also be selected. Further, it will be apparent to one skilled in the art that the socket support may be provided with a flange or other known means for mounting onto a conventional tool support fixture.

To understand how the parts above described are interrelated, the operation of the burnishing apparatus 100 will now be described. During operation, lubricating fluid is fed under pressure from the external lubricating fluid supply 138 by use of a conventional fluid pumping system (not shown), through the fitting 136 and fluid passage 134, and into the clearance 116 to force the burnishing ball 114 outwardly such that the forwardmost tip of the burnishing ball 114 extends slightly beyond the retaining edge 146 of the retaining cap 130. Capillary action then draws the lubricating fluid around the outer surface 112 of the burnishing ball 114 until fluid pressure is equalized to permit the burnishing ball 114 to float continuously upon a thin film of lubricating fluid thereby providing a freely rotating fluid bearing. The socket 108 is then advanced towards the surface 178 of the workpiece 144 until the forwardmost tip of the burnishing ball 114 makes contact with the workpiece surface 178. By further adjusting the fluid pressure, a desired amount of lubrication fluid will penetrate around the burnishing ball 114 and flow out through the fluid channels 148 in the retaining edge 146 to be transferred onto the surface 178 of the workpiece 144 to provide the desired lubrication and cooling for the burnishing operation.

The proper pressure or compressive force to be applied to the surface 178 of the workpiece 144 during the burnishing operation is provided by carefully tightening or loosening the adjustment screw 162. Because the burnishing ball 114 is coupled to the adjustment screw 162 through the spring means 166, tightening or loosening the adjustment screw 162 will cause the spring means 166 to compress or expand axially and will correspond to a given force exerted on the surface 178 of the workpiece 144 by the burnishing ball 114. Further, because the burnishing ball 114 is coupled through a spring means 166 having known spring characteristic, slight variations in the workpiece surface 178 will be absorbed by the spring means 166 without affecting the burnishing operation. Accordingly, the pressure or the compressive force exerted on the surface 178 of the workpiece 144 by the burnishing ball 114 can be precisely regulated. The burnishing operation is then controlled by a conventional electronic control unit, not shown, which controls the movement of the workpiece or the movement of the burnishing head.

In another preferred embodiment of the invention as shown in FIG. 4, the adjustment screw is replaced by a follower rod 180 of a cylinder piston assembly 182. By moving the follower rod 180 inwardly or outwardly, the spring tension is correspondingly increased or decreased and the pressure or compressive force applied by the burnishing ball 114 to the surface 178 of the workpiece 144 is correspondingly adjusted.

The apparatus for implementing the method of the present invention utilizes the process of single-point burnishing, whereby the forwardmost tip of the burnishing ball is caused to pass over the surface of the workpiece in a rolling motion to provide deep compression with a minimal amount of cold working and surface hardening. It has been unexpectedly found that the single-point burnishing method applied in a single-pass or multiple passes of reduced compressive force is effective for producing compressive residual stresses following tensile deformation of the surface and to a certain depth to produce deep compression with minimal cold working. Further, allowing the burnishing ball to function as a freely rotating fluid bearing, complex curved surfaces can be easily burnished.

Figure 5A:
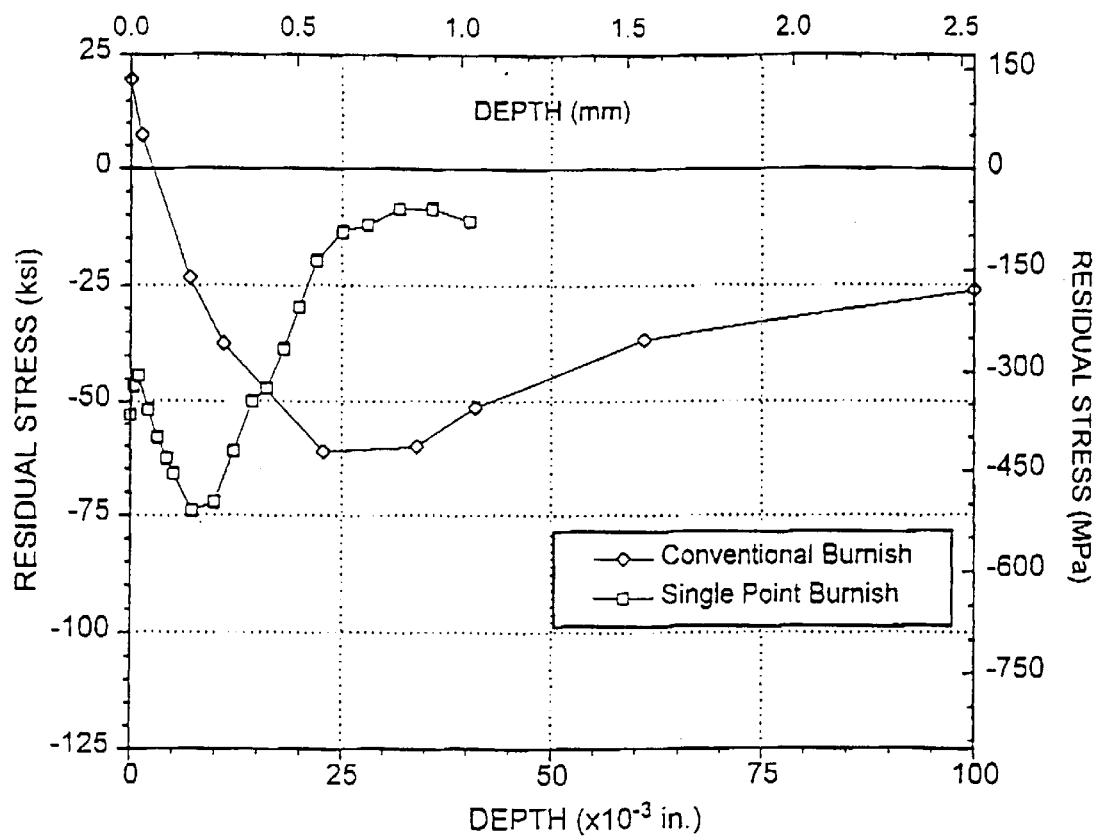
FIG. 5 is a graph illustrating the residual compressive stress layer induced in the surface of a workpiece (FIG. 5a) and the associated percent of cold working (FIG. 5b) produced by conventional burnishing and the burnishing method of the subject invention.
Figure 5B:
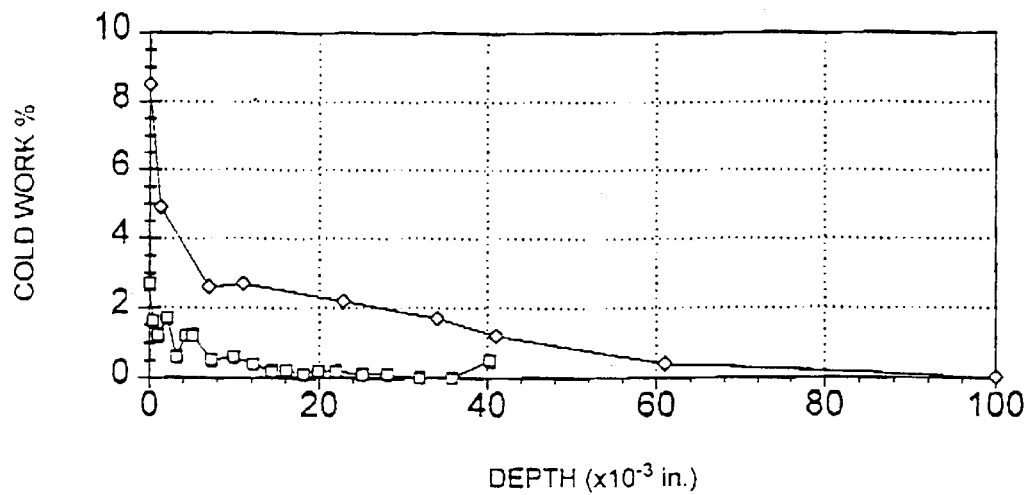
Figure 6A:
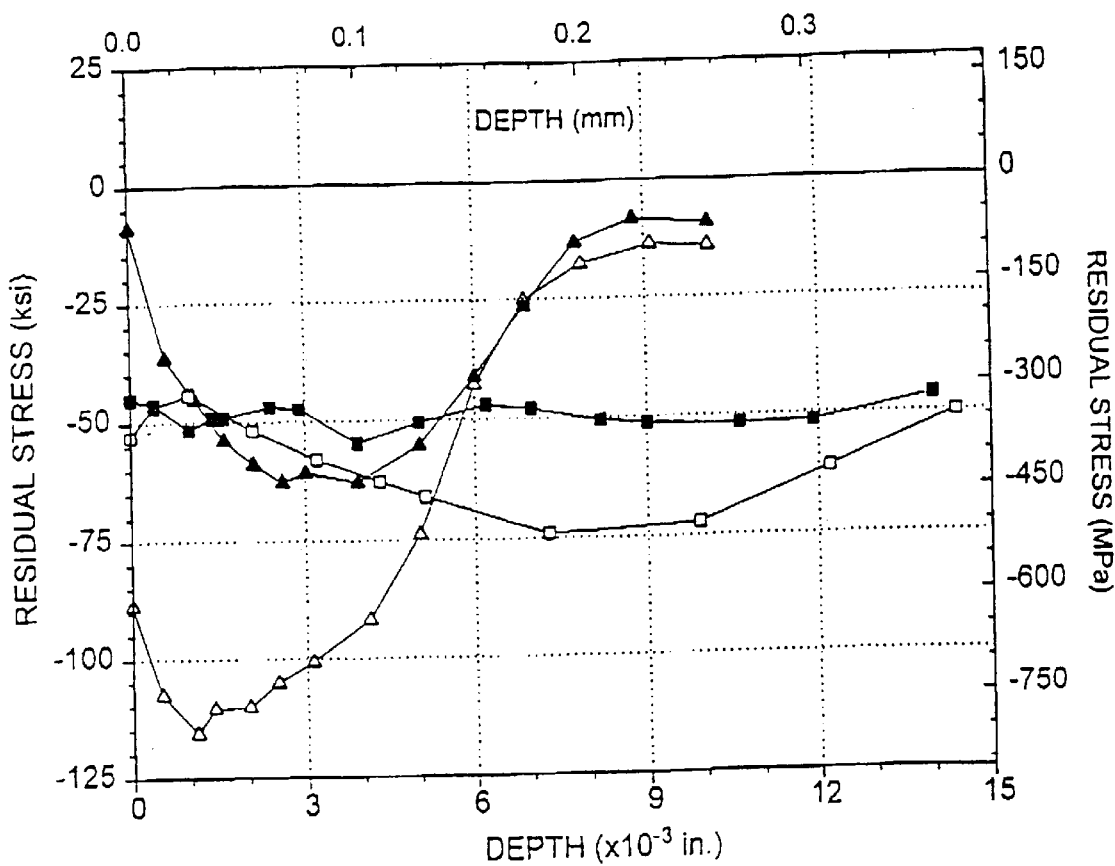
FIG. 6 is a graph illustrating the residual compressive stress layer induced in the surface of a workpiece and residual compressive stress retention after one hour at an elevated temperature (FIG. 6a) and the associated percent of cold working (FIG. 6b) produced by conventional shot peening and the burnishing method of the subject invention.
Figure 6B:
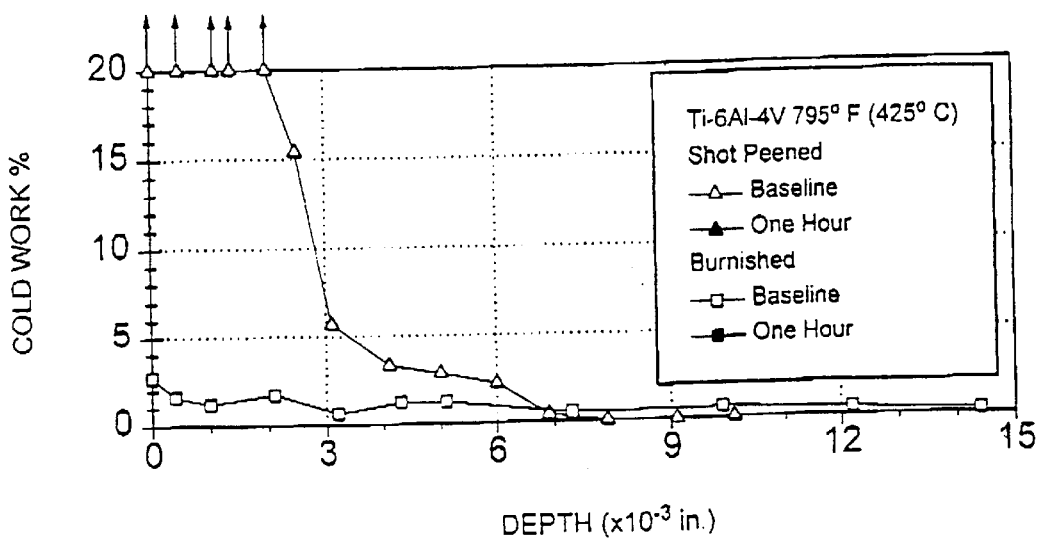
Figure 7A:
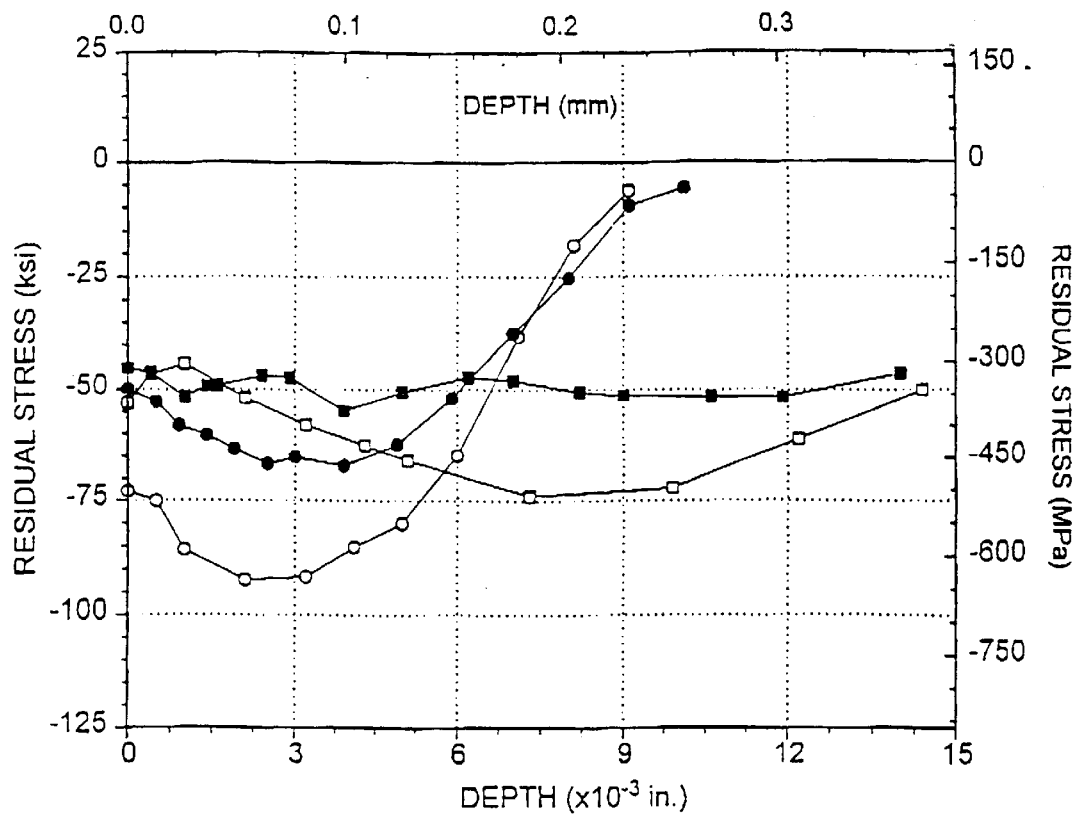
FIG. 7 is a graph illustrating the residual compressive stress layer induced in the surface of a workpiece and residual compressive stress retention after one hour at an elevated temperature (FIG. 7a) and the associated percent of cold working (FIG.7b) produced by conventional gravity peening and the burnishing method of the subject invention.
Figure 7B:
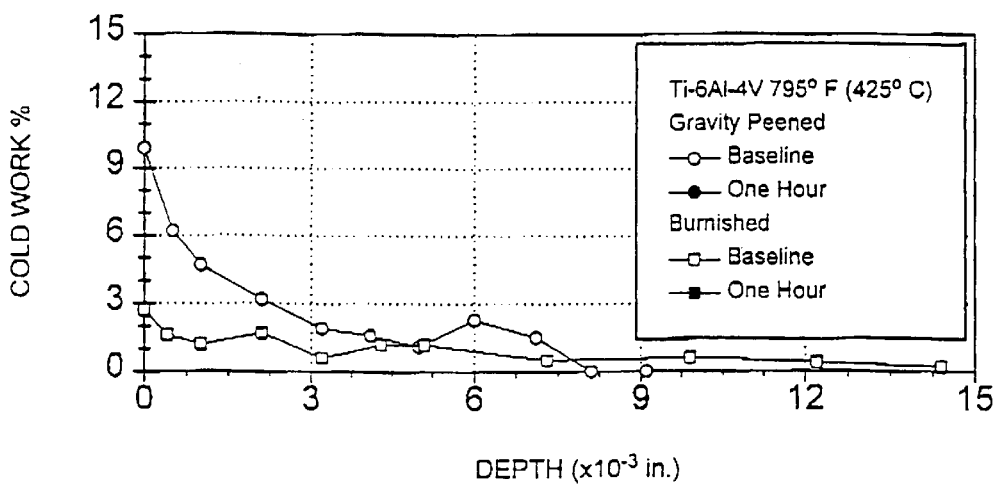

Referring to FIGS. 5, 6 and 7, the residual stress distribution and stress retention (FIGS. 5*a*, 6*a* and 7*a*) for the surface layer of a specimen and the percent of cold working associated therewith (FIGS. 5*b*, 6*b* and 7*b*) is shown comparing the single-point burnishing method of the subject invention with conventional burnishing, shot peening and gravity shot peening methods, respectively. The method for measuring subsurface residual stress and the percentage of cold working is known in the art and is described in Paul S. Prevey, "The Measurement of Subsurface Residual Stress and Cold Work Distributions in Nickel Base Alloys," *Residual Stress in Design, Process and Materials Selection*, ed. W.B. Young, Metals Park, Ohio: American Society for Metals, 1987, pp. 11–19. The single-point burnishing method of the subject invention produces cold work and surface work hardening far less than either conventional shot peening or gravity peening. Unexpectedly, it has been found that the increase in residual compressive stress with minimal cold work developed by the subject invention penetrates to a greater depth than most conventional methods, such as shot peening. Further, it has been unexpectedly found that by cold working the surface less than about 3.5%, and preferably less than about 2.0%, results in longer retention of compressive residual stress at elevated temperature, less rapid relaxation under cyclic loading, and minimizes the alteration of the residual stress field during tensile or compressive overload than conventional cold working and surface hardening processes. In addition, the burnishing method and the apparatus for implementing the method of the present invention automatically provides lubrication and cooling at the point of contact of the workpiece and the contact portion of the burnishing head thereby minimizing the deformation of the surface of the workpiece and without preventing or hindering the burnishing operation.

It will be apparent to one skilled in the art that the burnishing process and the apparatus for implementing the burnishing process of the subject invention can be utilized for a variety of workpiece configurations. For example, referring to FIG. 8, a workpiece 144 having more than one surface 178*a* and 178*b* is shown utilizing more than one burnishing apparatus 100 each having a socket 108 attached to a respective socket support 102. As shown, the socket supports 102 may be positioned to permit both surfaces 178*a* and 178*b* of the workpiece 144 to be burnished simultaneously and to permit the burnishing forces to be directly opposing and balanced to allow the workpiece 144 to be supported between the sockets 108.

In another example of an apparatus for implementing the burnishing process of the subject invention, as illustrated in FIG. 9, a workpiece 144 having a generally cylindrical inner surface 178 is burnished utilizing a pair of axially opposed burnishing apparatus 100, each having a socket 108 attached to a respective socket support 102.

Referring to FIG. 10, another embodiment of the apparatus for implementing the burnishing process of the subject invention is shown, whereby complex work surfaces such as found in dovetail slots for turbine or compressor disks used in turbomachinery may be easily burnished. A pair of sockets 108, which have been previously described and the detail of which has not been shown for clarity, are shown each mounted onto a lobe 184 of respective socket supports 102*a* and 102*b* in such a manner that the sockets 108 are directed outwardly at preselected angles. The socket supports 102*a* and 102*b* are rotatably pinned by a conventional pin 186 or other similar means to permit the socket 108 to be easily pivoted into position for engaging with the surface 178 of the workpiece 144. The socket supports 102*a* and 102*b* each include a bore 188 for receiving a threaded shank 190 of a bolt 192 secured in place by a conventional threaded washer 193. A spring means 194 is positioned about the shank 190 of the bolt 192 and is captured between the outer surface 196 of one socket support 102*a* and a nut 198 threaded on the shank 190 and is of sufficient force to prevent the nut 198 from rotating while permitting slight pivoting of the socket supports 102*a* and 102*b* to respond and absorb slight variations in the workpiece surface.

Accordingly, the method and apparatus for implementing the method of the subject invention provides a relatively inexpensive and effective means of providing a compression force on a workpiece to induce compressive stress in a well defined localized area of a simple or complex workpiece surface configuration with a minimum of cold working and surface hardening. By minimizing the amount of cold working and surface hardening, it has been unexpectedly found that the method of the subject invention produces longer retention of compressive residual stress at elevated temperature, less relaxation under cyclic loading, and minimizes the alteration of the residual stress field during tensile or compressive overload. Accordingly, contrary to the practice and teaching of the burnishing industry, the method and the apparatus for implementing the method of the subject invention induces a compressive stress layer in the surface of a workpiece while deliberately minimizing the amount of cold working and surface hardening.

While the method and apparatus described constitute preferred embodiments of the invention, it is to be understood that the invention is not limited to the precise method and apparatus, and that changes may be made therein without departing from the scope of the invention which is defined in the appended claims.

What is claimed is:

1. A method of inducing a compressive stress layer on the surface of a workpiece, the method comprising the steps of:

defining a surface area for receiving compressive stress; and performing a burnishing operation to produce a zone of deformation for inducing a deep layer of compression within the surface of the workpiece having associated cold working of less than about 3.5 percent.

2. The method of claim 1 wherein the associated cold working is less than about 2.0 percent.

3. The method of claim 1 wherein said burnishing operation is performed by a burnishing apparatus having a single-point burnishing means.

4. The method of claim 3 further comprising the step of passing said single-point burnishing means in a predetermined pattern across said defined surface area such that the zones of deformation formed by each pass of said single-point burnishing means do not substantially overlap.

5. The method of claim 3, wherein said burnishing apparatus is provided with control means for controlling the passing of said single-point burnishing means in a predetermined pattern across the surface of the workpiece.

6. The method of claim 3, wherein said burnishing apparatus comprises means for adjusting the force being applied by said single-point burnishing means against the surface of the workpiece.

7. The method of claim 3, wherein said single-point burnishing means comprises:
a socket having a tip member incorporating a ball seat;
a burnishing ball disposed within said ball seat; and
a removable retainer cap for retaining said burnishing ball within said ball seat.

8. The method of claim 7, wherein said burnishing apparatus further comprises:
a rod member integrally formed with said tip member;
a socket support for supporting said socket on a conventional tool holder;
means for directing lubrication fluid from a reservoir to said ball seat to permit said burnishing ball to freely rotate; and
means for automatically supplying said predetermined amount of lubrication and fluid to the surface of the workpiece.

9. The method of claim 8, wherein said lubrication fluid is directed into said tip member of said socket to force the burnishing ball outwardly towards the surface of the workpiece.

10. The method of claim 9, wherein capillary action draws said lubrication fluid around the outer surface of said burnishing ball until fluid pressure is equalized to permit said burnishing ball to float continuously upon a thin film of said lubrication fluid thereby allowing said burnishing ball to function as a freely rotating fluid bearing.

11. The method of claim 8 wherein said socket support comprises:
a slide comprising a longitudinally extending bore having a first end for receiving said rod member of said socket, and a second end having a threaded inner surface;
an adjustment screw received in said threaded inner surface of said bore, said adjustment screw having an inner end which is coupled to said rod member of said socket through a spring.

12. The method of claim 8 wherein said socket support comprises:
a slide comprising a longitudinally extending bore having a first end for receiving said rod member of said socket, and a second end for receiving a follower rod of a cylinder piston assembly.

13. The method of claim 1 further comprising the steps of:
predetermining the amount of lubrication and cooling required for performing the burnishing operation; and
automatically supplying the predetermined amount of lubrication fluid required for performing the burnishing operation to the surface of the workpiece.

14. A method of inducing a compressive stress on the surface of a workpiece with a minimal amount of cold working and surface hardening, the method comprising the steps of:
defining a surface area for receiving compression stress;
performing a burnishing operation by a burnishing apparatus comprising a socket having a tip member incorporating a ball seat and a freely rotating burnishing ball disposed within said ball seat;
forcing the forwardmost tip of said burnishing ball against the surface of the workpiece; and
rolling said burnishing ball over said defined surface area to induce a deep layer of compression within the surface with cold working of less than about 3.0 percent.

15. The method of claim 14 wherein said cold working is less than about 2.0 percent.

16. The method of claim 14, wherein said burnishing apparatus is provided with a control means for controlling the passing of said burnishing ball in a predetermined pattern across the surface of the workpiece.

17. The method of claim 14, wherein said burnishing apparatus further comprises:
a rod member integrally formed with said tip member;
a socket support for supporting said socket on a conventional tool holder;
means for directing lubrication fluid from a reservoir to said ball seat to force said burnishing ball outwardly towards the surface of the workpiece and to permit said burnishing ball to freely rotate; and
means for automatically supplying said lubrication fluid to the surface of the workpiece.

18. The method of claim 17 wherein said socket support comprises:
a slide comprising a longitudinally extending bore having a first end for receiving said rod member of said socket, and a second end having a threaded inner surface; and
an adjustment screw received in said threaded inner surface of said bore, said adjustment screw having an inner end which is coupled to said rod member of said socket through a spring.

19. The method of claim 17 wherein said socket support comprises:
a slide comprising a longitudinally extending bore having a first end for receiving said rod member of said socket, and a second end for receiving a follower rod of a cylinder piston assembly.

20. An apparatus for inducing a compressive stress on the surface of a workpiece with a minimal amount of cold working and surface hardening, the apparatus comprising:
a socket having a generally cylindrical tip member integrally formed with a generally cylindrical rod member, and a socket support for supporting said socket on a conventional tool holder, wherein said tip member comprising a ball seat having an essentially spherical shape adapted to the surface of a burnishing ball disposed within said ball seat;
a removable retainer cap for retaining said burnishing ball within said ball seat; and
means for directing lubrication fluid from a reservoir to said ball seat to force said burnishing ball outwardly toward the surface of the workpiece and for providing said lubricating fluid around the outer surface of said burnishing ball to permit said burnishing ball to float continuously upon a thin film of said lubricating fluid;
wherein said socket support comprises a slide having a longitudinally extending bore having a first end for receiving said rod member and a threaded end having a threaded inner surface, wherein an adjustment screw is received in said threaded inner surface of said bore, and wherein said adjustment screw includes an inner end coupled to said rod member through a mechanical spring means.

* * * * *

(12) EX PARTE REEXAMINATION CERTIFICATE (5183rd)
United States Patent
Prevey, III

(10) Number: US 5,826,453 C1
(45) Certificate Issued: Aug. 16, 2005

(54) BURNISHING METHOD AND APPARATUS FOR PROVIDING A LAYER OF COMPRESSIVE RESIDUAL STRESS IN THE SURFACE OF A WORKPIECE

(75) Inventor: Paul S. Prevey, III, Cincinnati, OH (US)

(73) Assignee: Surface Technology Holdings, Ltd., Cincinnati, OH (US)

Reexamination Request:
No. 90/006,797, Oct. 3, 2003

Reexamination Certificate for:
Patent No.: 5,826,453
Issued: Oct. 27, 1998
Appl. No.: 08/761,064
Filed: Dec. 5, 1996

(51) Int. Cl.[7] .............................................. B21D 31/00
(52) U.S. Cl. .............................. 72/75; 72/377; 29/90.01
(58) Field of Search ............................ 72/75, 110, 377; 29/90.01

(56) References Cited

U.S. PATENT DOCUMENTS

| | | | | | |
|---|---|---|---|---|---|
| 2,541,455 A | * | 2/1951 | Anderson | ........................ | 72/75 |
| 3,727,443 A | * | 4/1973 | Quinlan | ...................... | 72/31.06 |
| 4,947,668 A | | 8/1990 | Ostertag | | |

OTHER PUBLICATIONS

"Tools for Roller Burnishing, Deep Rolling, Forming" Published by W. Hegenscheidt GmbH, Celle, Germany, May 1991.

"Tools for Roller Burnishing, Deep Rolling, Forming" Published by Ecoroll AG Werkzeugtechnik, Celle, Germany, Apr. 1996.

"Operating Instructions, No. 080592 E/3, Hydrostatic Roller Burnishing Tool HG4–, HG6–, HG13–9", Published by Ecoroll AG Werkzeugtechnik, Celle, Germany, Oct. 10, 1996.

"Operating Instructions, NR. 141293E/4, Hydraulic Pump Unit HGP3.0" Published by Ecoroll AG Werkzeugtechnik, Celle, Germany, Jul. 3, 1996.

"Tooling Technology Division, Working Example 501/HG" Published by W. Hegenscheidt GmbH, Celle, Germany, May 14, 1991.

"The Influence of Surface Enhancement by Low Plasticity Burnishing on the Corrosion Fatigue Performance of AAA 7075–T6", by Paul Prevey and John Cammett, Publish in the Proceedings for the 5th Int Aircraft Corrosion Workshop, Solomons, MD, Aug. 20–23, 2002.

"Damage Tolerance Improvement of Ti–6–4 Fan Blades With Low Plasticity Burnishing", by Paul Prevey, D. Hornbach, John Cammett, and R. Ravindranath, Published in the Proceedings for the 6th Joint FAA/DOD/NASA Aging Aircraft Conference, Sep. 16–19, 2002.

(Continued)

Primary Examiner—Daniel C. Crane

(57) ABSTRACT

The burnishing method and apparatus for implementing the method of the present invention utilizes a single-point burnishing process to provide deep compression with a minimal amount of cold working and surface hardening. In particular, the area to be burnished along the surface of a workpiece is defined and a freely rotating burnishing ball is forced against the surface of the workpiece to produce a zone of deformation having a deep layer of compression within the surface. The burnishing ball is then rolled over the surface in a substantially nonoverlapping pattern. A preferred embodiment of the burnishing apparatus for implementing the burnishing method comprises a socket having a tip member incorporating a ball seat, a burnishing ball disposed within the ball seat, a rod member integrally formed with the tip member; and a socket support for supporting the socket on a conventional tool holder. The socket is provided with means for directing lubrication fluid from a reservoir to the ball seat to permit the burnishing ball to freely rotate and for directing a predetermined amount of lubrication fluid to the surface of the workpiece.

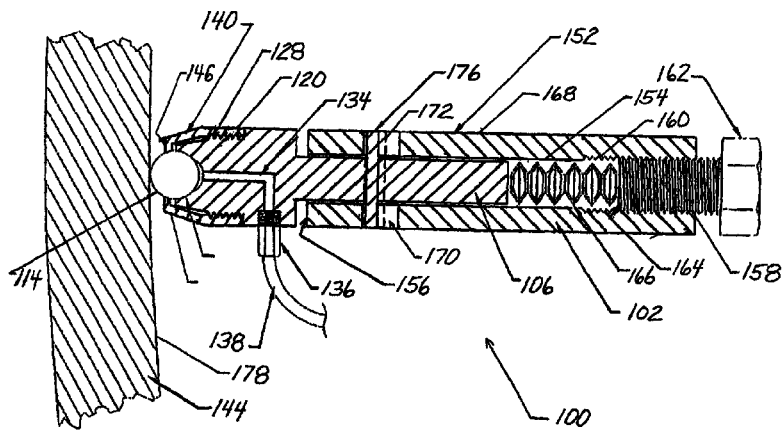

OTHER PUBLICATIONS

"Effects of Surface Treatment on Fretting Fatigue Performance of Ti–6A1–4V", by Paul Prevey, N. Jayaraman, and Michael Shepard, Published in the Proceedings of the 8$^{th}$ National Turbine Engine High Cycle Fatigue (HCF) Conference, Apr. 14–16, 2003.

"The Effect of Low Plasticity Burnishing (LPB) on the HCF Performance and FOD Resistance of Ti–6A1–4V", by Paul Prevey, Michael Shepard, and Paul Smith, Published in the Proceedings of the 6$^{th}$ National Turbine Engine High Cycle Fatigue (HCF) Conference, Mar. 5–8, 2001.

"Characterization of Tensile Residual Stresses in 7050–T7651 Aluminum Friction Stir Welds", by Paul Prevey, Published in Diffraction Notes #29 by Lambda Research, Summer 2002.

"Corrosion Damage Mitigation and Improved Fatigue Performance of Low Plasticity Burnished 7075–T6", by Paul Prevey and John Cammett, Published in the Proceedings of the 4$^{th}$ International Aircraft Corrosion Workshop, Solomons, MD, Aug. 22–25, 2000, also submitted for publication in the Journal of Materials Engineering Performace, Oct. 2000.

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–20 is confirmed.

\* \* \* \* \*

(12) EX PARTE REEXAMINATION CERTIFICATE (5945th)
United States Patent
Prevey, III

(10) Number: US 5,826,453 C2
(45) Certificate Issued: Oct. 9, 2007

(54) BURNISHING METHOD AND APPARATUS FOR PROVIDING A LAYER OF COMPRESSIVE RESIDUAL STRESS IN THE SURFACE OF A WORKPIECE

(75) Inventor: Paul S. Prevey, III, Cincinnati, OH (US)

(73) Assignee: Surface Technology Holdings, Ltd., Cincinnati, OH (US)

Reexamination Request:
No. 90/007,754, Oct. 19, 2005

Reexamination Certificate for:
Patent No.: 5,826,453
Issued: Oct. 27, 1998
Appl. No.: 08/761,064
Filed: Dec. 5, 1996

Reexamination Certificate C1 5,826,453 issued Aug. 16, 2005

(51) Int. Cl.
*B21D 31/00* (2006.01)

(52) U.S. Cl. .................... 72/75; 29/90.01; 72/377
(58) Field of Classification Search ............... 72/75, 72/377; 29/90.01
See application file for complete search history.

(56) References Cited

U.S. PATENT DOCUMENTS

| | | | |
|---|---|---|---|
| 3,727,443 A | 4/1973 | Quinlan | |
| 4,947,668 A | 8/1990 | Ostertag | |
| 5,826,453 A | 10/1998 | Prevey | |

OTHER PUBLICATIONS

"Tools for Roller Burnishing, Deep Rolling, Forming", May 1991, W. Hegenscheidt GmbH, Celle, Germany.
"Tools for Roller Burnishing, Deep Rolling, Forming", Apr. 1996, Ecoroll AG Werkzeugtechnik, Celle, Germany.
"Quotation", Mar. 1, 1996, Ströher Printing, Celle, Germany.
"Requisition Order", Apr. 29, 1996, Ecoroll AG Werkzeugtechnik, Celle, Germany.
"Invoice", Jul. 23, 1996, Ströher Printing, Celle, Germany.
"Application Description Nr. AO-4088/IE Deep Rolling", Mar. 19, 1996, Ecoroll AG Werkzeugtechnik, Celle, Germany.
"Operating Instructions No. 080592E/3, Hydrostatic Roller Burnishing Tool HG4-, HG6-, HG13-9", Oct. 10, 1996, Ecoroll AG Werkzeugtechnik, Celle, Germany.
"Practical Metallurgy", 1940, George Sachs and Kent R. Van Horn, American Society of Metals, Book.
"The Effect of Type of Cold Deformation on the Recrystallization Properties of Armco Iron", Herman F. Kaiser and Howard F. Taylor, Paper Published in the Transactions of American Society for Metals, vol. 27, pp. 227–267, 1939.

(Continued)

*Primary Examiner*—Jimmy G. Foster

(57) ABSTRACT

The burnishing method and apparatus for implementing the method of the present invention utilizes a single-point burnishing process to provide deep compression with a minimal amount of cold working and surface hardening. In particular, the area to be burnished along the surface of a workpiece is defined and a freely rotating burnishing ball is forced against the surface of the workpiece to produce a zone of deformation having a deep layer of compression within the surface. The burnishing ball is then rolled over the surface in a substantially nonoverlapping pattern. A preferred embodiment of the burnishing apparatus for implementing the burnishing method comprises a socket having a tip member incorporating a ball seat, a burnishing ball disposed within the ball seat, a rod member integrally formed with the tip member; and a socket support for supporting the socket on a conventional tool holder. The socket is provided with means for directing lubrication fluid from a reservoir to the ball seat to permit the burnishing ball to freely rotate and for directing a predetermined amount of lubrication fluid to the surface of the workpiece.

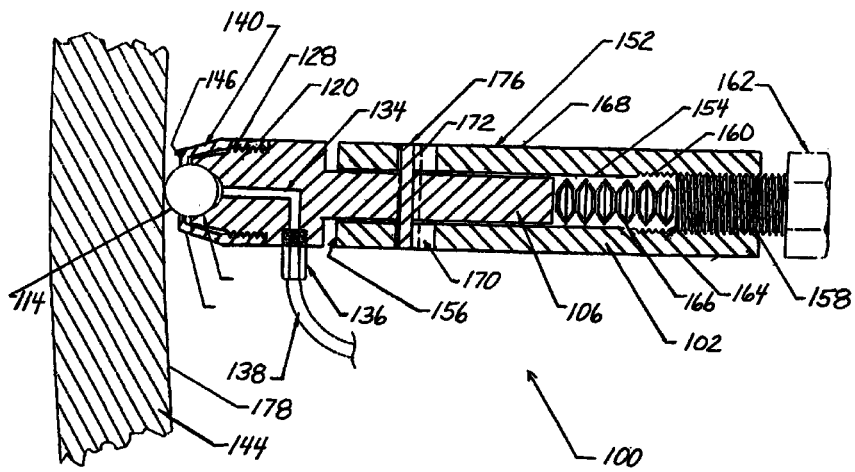

OTHER PUBLICATIONS

"Test Report No.: V380502", Alfred Ostertag, Ecoroll AG Werkzeugtechnik, Apr. 1, 1996.

"Test Report No.: V380985", Alfred Ostertag, Ecoroll AG Werkzeugtechnik, Apr. 24, 2003.

"Measurements of the Amount of Cold Work on Specimens from Trial V380985 Delivered by Ecoroll", Berthold Scholtes and I. Altenberger, University of Kassel, Germany, Mar. 10, 2004.

"The Effect of Low Plasticity Burnishing (LPB) on the HCF Performance and FOD Resistance of TI–6AL–4V", Paul Prevey, Michael Shepard, and Paul Smith, Published in the Proceedings of the 6$^{th}$ National Turbine Engine High Cycle (HCF) Fatigue Conference, Jacksonville, FL, Mar. 5–8, 2001.

"Diamond Burnishing Tool", Product Flyer Published by Cogsdill Tool Products, Lugoff, SC, 1991.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–20 is confirmed.

* * * * *